Feb. 26, 1963     C. I. WILLIAMS     3,079,186
OVERLAP ROD CONNECTOR
Filed March 14, 1960

INVENTOR:
CHESTER I. WILLIAMS
BY
Glenn B. Morse
atty.

United States Patent Office 3,079,186
Patented Feb. 26, 1963

3,079,186
OVERLAP ROD CONNECTOR
Chester I. Williams, P.O. Box M925, Grand Rapids, Mich.
Filed Mar. 14, 1960, Ser. No. 14,791
1 Claim. (Cl. 287—114)

This invention provides a device for splicing rods together in overlapping relationship, usually for the transmission of tension. The preferred form of the invention has been developed in conjunction with bracing for forms used in pouring concrete. Situations are continually occurring in this field where forces must be transmitted from an anchoring point to a form structure, and it is rarely practical to accurately predetermine the length of the rod extending from the anchor up to the point of connection with the form. The standard procedure normally involves the connection of the brace rod to the form structure, followed by the coupling of this rod with a rod of similar diameter which extends to a suitable anchoring device. Formerly, this connection was effected either by welding the two rods together, or by cutting off the rods so that they can be engaged by a coaxial coupling of known design. Welding of this connection not only requires a considerable amount of time and the services of a highly skilled workman, but also becomes completely impractical when a connection is to be made in a location where it is difficult to carry the welding equipment. With regard to the coaxial form of coupling, it becomes necessary to cut the rods to a certain gap within the range of adjustment of the coupling, and this presents a considerable limitation on the erection procedures. The cost and inconvenience of cutting rods to length is also something to be considered.

The present invention provides a device for securing rods together in overlapping relationship, which eliminates the necessity of cutting the rods to length. With this arrangement, the form can be properly aligned, and even re-aligned, with the assurance that the splicing device will maintain this alignment as long as there is a few inches of overlap of the rod.

The several features of the invention will be analyzed in detail through the discussion of the particular embodiments illustrated in the accompanying drawing. In the drawing:

FIGURE 1 presents a perspective view of a fully-assembled device prior to engaging it with the overlapping rods.

FIGURE 2 presents a perspective view of one of the wedge blocks of the device shown in FIGURE 1.

FIGURE 3 presents an end elevation of the device shown in FIGURE 1.

Figure 5:
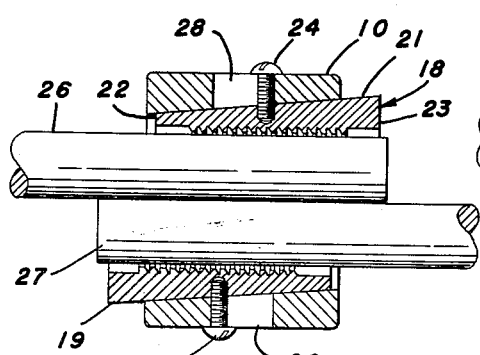
FIGURE 5 illustrates the relationship of the rods and the splicing device during the installation, and prior to the "setting" of the wedge blocks.
Figure 6:
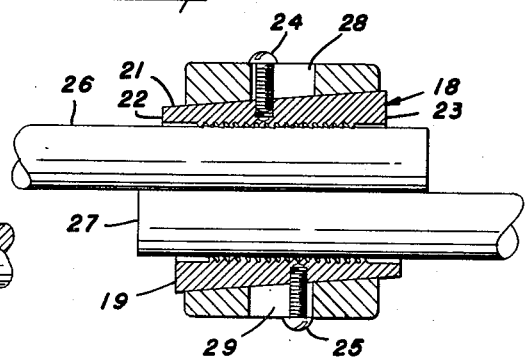
FIGURE 6 illustrates the condition of the device in the locked position.

Referring to the drawing, the splicing device includes the frame 10 having a central opening 11. The offset areas 12 and 13 provide the shoulders 14—17 which contribute to the positioning of the wedge blocks 18 and 19 prior to the engagement of the device with overlapping rods as shown in FIGURES 5 and 6. After engagement with the rods, the areas 12 and 13 assist in confining them against assuming a skewed relationship which might interfere with the action of the wedge blocks.

Figure 1:
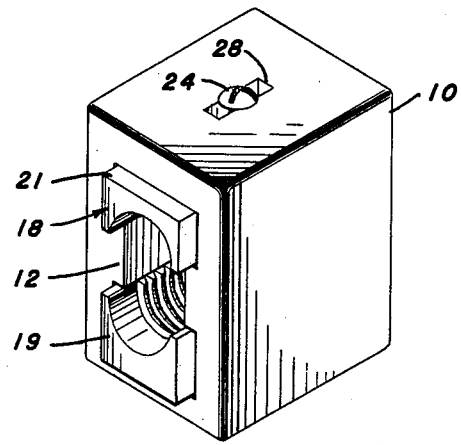
Figure 2:
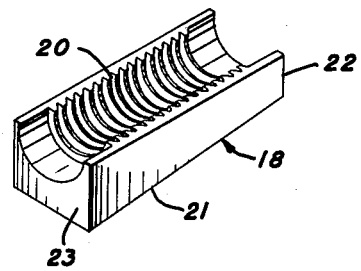
Figure 3:
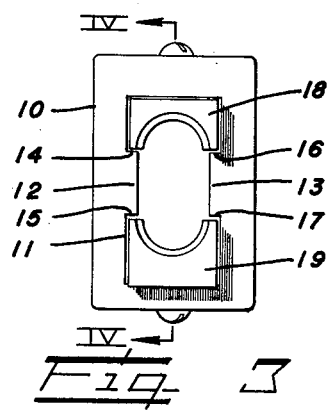
Figure 4:
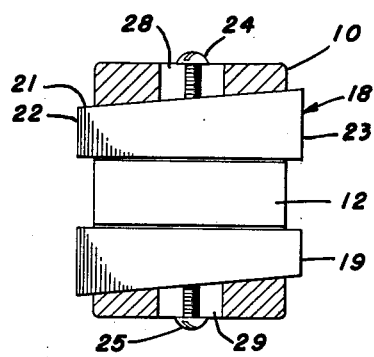
FIGURE 4 is a section of the plane IV—IV in FIGURE 3, with the wedge blocks shown in elevation.

The wedge blocks themselves are both constructed as shown in FIGURE 2. These blocks are provided with approximately a 180 degree sector of a threaded bore which is indicated at 20, the threads being of the form commonly known as "buttress." This thread form involves one face of the threads arranged approximately perpendicularly to the axis of the bore, with the opposite face of the thread being at a considerable incline. It is the ends of these threads that contact the surface of the rods, and the inclination of the thread is in the direction such that rod movement would tend to take place against the perpendicular face of the threads. The axis of the threaded bore is at an angle with respect to the back 21 of the blocks, with the resulting angle of convergence causing the height of the block at the end 22 to be smaller than that at the end 23.

Prior to installation, the screws 24 and 25 are tightened with the blocks in the position shown in FIGURE 5, which creates the maximum clearance for the insertion of the rods 26 and 27. The installation up to the point shown in FIGURE 5 is accomplished by separating the rods sufficiently for the device to be slipped over one of them and backed far enough for the rods to be brought together as shown. The device is then moved in the opposite direction sufficiently to engage the overlapped portions. When the form structure has been properly aligned and the brace is ready for securing, the device is "set" in position by loosening the screws 24 and 25, and then urging the blocks in the direction of convergence so that they tend to close the space between which the rods 26 and 27 are confined. This operation is normally followed by tapping the blocks in the same direction to assure engagement of the threaded bores 20 with the surfaces of the rod. After this has taken place, the application of tension to the rods 26 and 27 will tend to drag the wedge members in the direction of convergence, and cause them to bite more securely into the surface of the rods. The frame 10 is sufficiently strong to resist the outward pressure created by this action, with the net result that the jamming action solidly secures the rods 26 and 27 in their relative position. The slots 28 and 29 in the frame for accommodating the screws 24 and 25 are not used for establishing the locked position of the device. As soon as the blocks have been engaged with the rods, the screws perform no further function. They may be either left in position in the device, or removed.

The formation of the wedge blocks 18 and 19 is best performed by boring and threading a piece of steel having a trapezoidal cross section such as will result by placing the two blocks together, with the small ends in a co-planar relationship. Material of this type may be obtained as a specially-rolled section of steel, which may be cut off to the proper lengths to form the blocks. After the boring and threading has been completed, the trapezoidal piece can be slit to form the two blocks. If symmetrical threads are used (with the same inclination one way as the other) the wedge blocks could be made from a single piece which is rectangular in cross section, with the threaded bore moving through it at the desired angle with respect to the outer surfaces. Cutting the piece in the plane of the bore axis will establish blocks which will be similar in formation. When non-symmetrical threads are used, as in the preferred form of the invention, the trapezoidal material should be used. In either case, the threads should be locally hardened as by a case-hardening operation to assure the best engagement with the surface of the rods 26 and 27.

The particular embodiments of the present invention which have been illustrated and discussed herein are for illustrative purposes only and are not to be considered as a limitation upon the scope of the appended claim. In this claim, it is my intent to claim the entire invention disclosed herein, except as I am limited by the prior art.

I claim:

A connector comprising a frame member having a longitudinal axis, an axial opening, opposed walls providing internal substantially parallel surfaces inclined with respect to said axis, and having transverse slots extending outwardly from said surfaces through said walls respectively; a pair of wedge members slidably engaging said surfaces repectively, and having roughened surfaces proximate to one another providing projections lying substantially parallel to said axis for engaging an article to be clamped; and a screw extending freely through each of said slots threadedly engaging said wedge members respectively, said screws having heads frictionally engaging the outer surfaces of said walls respectively when said screws are advanced into said wedges while said wedges are in relatively retracted positions for admission of an article to be clamped.

References Cited in the file of this patent

UNITED STATES PATENTS

| | | |
|---|---|---|
| 1,379,165 | Burns et al. | May 24, 1921 |
| 1,425,359 | Barry | Aug. 8, 1922 |
| 1,694,628 | Sauver | Dec. 11, 1928 |
| 1,712,108 | Goeller | May 7, 1929 |
| 1,741,804 | Zilliox | Dec. 31, 1929 |
| 2,016,065 | Wilson | Oct. 1, 1935 |
| 2,064,440 | Meeker | Dec. 15, 1936 |

FOREIGN PATENTS

| | | |
|---|---|---|
| 861,214 | France | Oct. 22, 1940 |